United States Patent [19]

Hsu

[11] Patent Number: 4,850,849

[45] Date of Patent: Jul. 25, 1989

[54] APPARATUS FOR STEAM PRESSING COMPRESSIBLE MAT MATERIAL

[75] Inventor: Wu-Hsiung E. Hsu, Gloucester, Canada

[73] Assignee: Forintek Canada Corp., Ottawa, Canada

[21] Appl. No.: 188,037

[22] Filed: Apr. 29, 1988

[51] Int. Cl.[4] ................................................ B29J 5/02

[52] U.S. Cl. ...................................... 425/407; 264/83; 264/101; 264/109; 425/384; 425/406; 425/411

[58] Field of Search ..................... 425/406, 407, 405.1, 425/384, 387.1, 388, 86, 410, 411, 420; 264/83, 101, 109

[56] References Cited

U.S. PATENT DOCUMENTS

| | | | |
|---|---|---|---|
| 3,230,237 | 10/1966 | Corbin et al. | 264/109 |
| 3,891,738 | 6/1975 | Shen | 264/101 |
| 4,162,877 | 7/1979 | Nyberg | 425/84 |
| 4,393,019 | 7/1983 | Geimer | 264/83 |
| 4,462,785 | 7/1984 | Smith | 425/387.1 |
| 4,517,147 | 5/1985 | Taylor et al. | 264/83 |

FOREIGN PATENT DOCUMENTS 1075140 4/1980 Canada .

*Primary Examiner*—Jan H. Silbaugh
*Assistant Examiner*—Mary Lynn Fertig
*Attorney, Agent, or Firm*—Trevor C. Klotz

[57] ABSTRACT

A press apparatus and method for steam pressing a mat of compressible material and a binder into a formed product and has particular application to the steam pressing of lignocellulosic material and a binder to form composite board and includes a border projection means generally configured to the outline of the end product to be produced and which is carried by a press platen, preferably the upper press platen, and which is intended to impinge into the mat during its compression and to effect a steam pressure seal at the impingement area of the mat. As a pressure seal of the compressed mat is created about the mat edges, steam can then be passed through the mat in order to cure the binder. If desired, cool air can be passed through the mat afer steaming to condense residual steam in the mat. The compressed mat after steaming, can also be subject to vacuum prior to releasing it from the press. The edges of the cured mat which have been subject to impingement, can subsequently be trimmed off.

16 Claims, 3 Drawing Sheets

APPARATUS FOR STEAM PRESSING COMPRESSIBLE MAT MATERIAL

BACKGROUND OF THE INVENTION

1. FIELD OF INVENTION:

This invention relates to a novel method and apparatus for steam pressing a mat of compressible material and a binder into a finished product, and has particular application to the steam pressing mats of lignocelluloses material and thermosetting binders into composite products.

2. DESCRIPTION OF THE PRIOR ART:

For composite board manufactures, press time is one of the most important factors in determining the production rate and thus the production efficiency and cost. Normally, the hot pressing operation involved when forming a panel from a mat of lignocellulosic material and a thermosetting resin or binder controls the rate of panel production, and is a function of the thickness of the panel to be formed.

It has been recognized in the art that steam press time for particle board or like products can be drastically reduced by passing pressurized steam through the pressed board, to thereby effect a faster heat transfer within the pressed board for the purpose of causing the binder or resin to set. To date, however, none of these techniques has proven to be practical or effective for the production of wood-based composites with improved dimensional stability at short press times.

For example, K. C. Shen in U.S. Pat. No. 3,891,738 issued June 24, 1975, discloses the passage of pressurized steam through a mat by introducing steam from one platen, and exhausting the steam transmitted through the mat by the other platen. In this press as disclosed by Shen, the mat is located internally of a peripheral wall or framework which is positioned between the two platens. A proper seal between this peripheral wall or framework and platens is critically required in order to form a sealed chamber when the press is closed. Not only does the peripheral wall surrounding the mat reduce the usable platen area, but because the opposed platens are effectively sealed, a real risk of steam explosion exists.

The steam press described in Canadian Patent No. 1,075,140 - Donald W. Nyberg issued Apr. 8, 1980 is somewhat similar to that of Shen, in that a framework surrounds the mat positioned between the platens and hence creates a closed chamber. Unlike Shen, however, the steam apertures and supply conduits are located in one platen only and thus steaming and exhaustion are through this single or common platen. Consequently, this arrangement cannot provide a pressure differential between the exterior mat surfaces, which results in air and water pockets being formed in the pressed board and which can result in improper resin or binder cure in some areas. Further, the Nyberg press, like Shen, requires a perfect seal about the mat and is also susceptible to explosion.

The press as disclosed by Robert L. Geimer in U.S. Pat. 4,393,019 issued July 12, 1983 is an unsealed steam pressure system in the sense that the strong peripheral walls characteristic of the Shen and Nyberg presses are not required. Thus, hot pressing steam injected into the mat is permitted to escape from all of the mat edges. Further, as the steam is injected into both mat surfaces at the same time, air or water pockets, as above discussed, are formed thus preventing uniform cure throughout the formed board. Moreover, since the system is unsealed, and as cautioned by Geimer, the steam pressure employed should not be such that it blows the mat material out of the press. It would also appear that the Geimer type of press is not capable of producing sufficiently high temperatures within a reasonable time frame to achieve curing of certain binders, such as phenol-formaldehyde resin.

SUMMARY OF THE INVENTION

In accordance with one feature of my invention, steam pressing of mat material as herein contemplated can be carried out without the necessity of strong press design which is required in sealed presses as above described, and further, without undue concern about binder undercure resulting from air and water pockets and mat material blow out where the pressurized steam is permitted to evacuate through the mat edges. Further, utilizing my concept, many existing presses can be retrofitted in the field so as to function in the manner contemplated.

While my invention is primarily intended for use in producing composite board from a mat of lignocellulosic material and a thermosetting binder, it can also be used in forming products from other organic or inorganic mat materials, such as glass fibre, man-made fibre and mica.

In accordance with my invention, border projection means extends from one of the opposed press platen faces (or one of the steam plates when employed as part of the platen) a distance less than spacing between the platens when in their closed condition, so that when the platens are closed to this target thickness representing the desired thickness of the product, the edges of the mat are impinged by the border projection means in order to create a steam pressure seal about the mat in the impingement area. In other words, when the press is in its closed or near closed position, the edges of the mat are effectively sealed from the atmosphere as a result of the additional compression imparted to the mat about its periphery and this sealing effect is sufficient to withstand steam pressure buildup experienced by the remainder of the mat during steam curing of the binder. As a result of the sealing the compressed mat can be fast heated by the passage of pressurized steam therethrough and which is advantageously introduced into the mat from one platen face and exhausted through or at the face of the other platen.

If the product to be produced is rectangular, for example, and which is the common shape of composite board, the uncured mat and the border projection means are both relatively rectangular in shape.

Steam can be easily built up internally of the mat due to the formation of sealed edges thereabout. As a result, components in the pressed mat such as wood, water and adhesives can be heated up in a relatively short time and regardless of thickness without undue regard to explosion, mat blow-out or resin undercure. Additionally, improved dimensional stability can be imparted to the pressed product by prolonging the steam treatment time only slightly but well below that required with conventional (not-steam) presses. Furthermore, I have found that a lignocellulosic mat, with high moisture content, can be made into a final product within a short press time and without causing mat blow-out or resin undercure.

As will be appreciated, pressurized steam can be introduced from one platen and evacuated at the other, in either direction, or alternating direction employing suitable steam supply and exhaust means which may advantageously be incorporated into the platens themselves. It is also possible to employ steam injection or steam exhaust press face plates which can be connected to the platens themselves or, and particularly with respect to the bottom platen, made removable and thus they can serve to transport the mat to and from the press. Provided conventional support mesh for the mat is sufficiently porous, it too can advantageously be employed as a steam exhaust plate, and simply positioned over the bottom platen which itself may have no provision for exhausting pressurized steam.

The border projection means as above described is preferably carried directly by the upper platen. In this configuration, steaming means, functioning either as steam injection means or steam exhaust means can extend through the upper platen and are connected to a steam pressure supply source or vented to the atmosphere, depending upon the direction of steam flow. Alternatively, the border projection means can be attached to either a steam injection or exhaust press face plate (depending on flow direction) which is in turn secured to the upper platen and hence this element can be regarded as being part of the upper platen.

In accordance with yet a further feature of my invention, I have found that once the product has been cured and the supply of steam is turned off, steam within the pressed mat can be evacuated under vacuum using the existing steam injection or steam exhaust means or optionally by the use of separate vacuum means. It is also possible to inject cool air through the product in a manner similar to that employed when injecting steam through the mat. Indeed, the existing steam means can be used for this purpose.

Passing cool air through the product has the feature of condensing entrapped or residue steam within the board and thereby contributes to an increase in moisture content of the formed product. It also reduces pressure build-up and the likelihood of pressure blow when the press pressure is released.

BRIEF DESCRIPTION OF THE DRAWINGS

In the accompanying drawings which illustrate several representative embodiments of the invention.

DETAILED DESCRIPTION OF THE DRAWINGS

Figure 1:
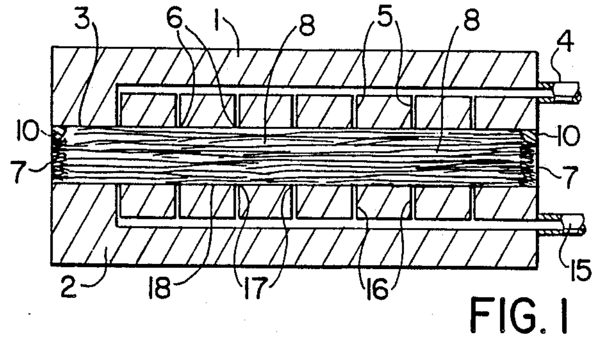
FIG. 1 is a cross-sectional view of a representation steam press as used in forming ridged panel composite board and where the border projection means is carried by the top press platen and where the steam supply and steam discharged means are carried by opposed press platens.

With reference to FIGS. 1 through 4, for ease of understanding, the same reference numerals have been used to indicate like parts. The common elements include upper press platen 1 and lower platen 2 and which are illustrated with mat 8 therebetween and which has been compresses to its target thickness.

Figure 2:
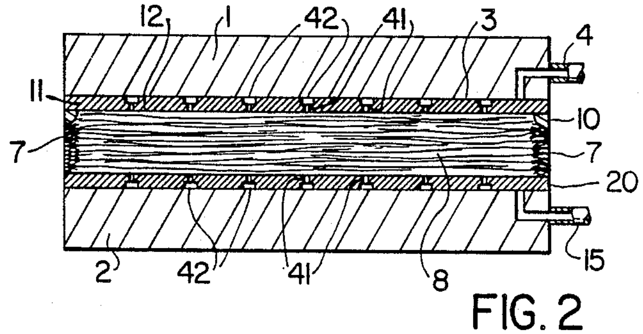
FIG. 2 is a similar to FIG. 1, but where steam injection and steam exhaust press plate faces are carried by and form part of opposed platens.
Figure 3:
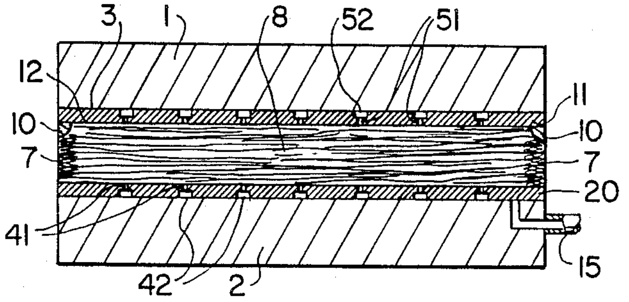
FIG. 3 is a similar to FIG. 2, but in this instance, the upper plate includes a steam exhaust press plate which is vented to the atmosphere.
Figure 4:
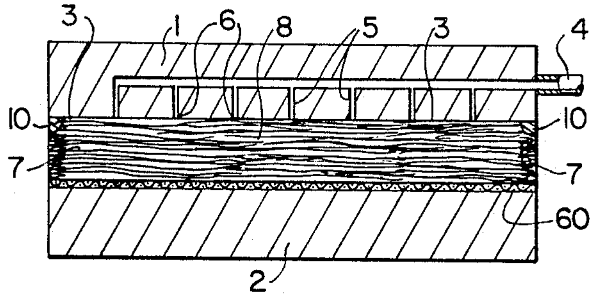
FIG. 4 is a similar to FIG. 3, but where the bottom plate is a wire screen or caul and functions as a steam exhaust plate.

Boarder projection means 10 is carried directly by and extends downwardly from face 3 of upper platen 1 as seen in FIGS. 1 and 4. If upper platen 1 includes an upper steam plate 11 as discussed in greater detail below and as best seen in FIGS. 2 and 3, the projection means 10 is directly connected to face 12 of this plate 11 which in this application is regarded as being part of the upper press platen 1. p The main portion of upper platen 1 can include steam passage 4 which communicate with conduits 5 which themselves communicate with apertures 6 in face 3 as seen in FIGS. 1 and 4. Steam passageway 4 can also communicate directly with steam plate 11 as illustrated in FIG. 2.

In a similar manner, lower platen 1 can include steam passage 15 which as seen in FIG. 1 communicates with conduits 16 which themselves communicate with apertures 17 on face 18 of the lower platen as seen in FIG. 1. Alternatively, and as seen in FIGS. 2 and 3, passageway 15 can communicate directly with lower steam plate 20.

Figure 5A:
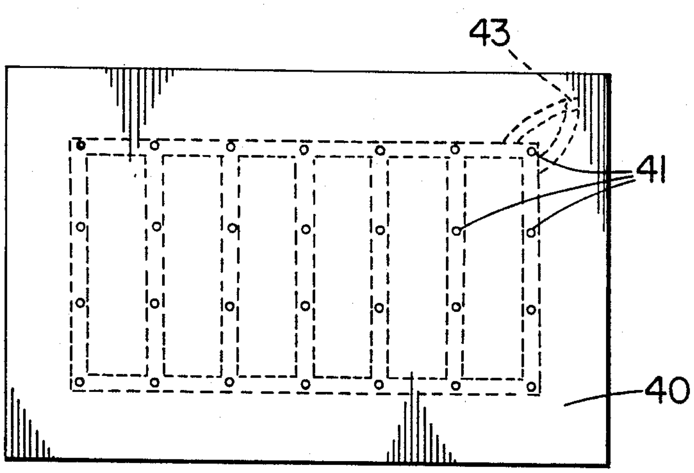
FIG. 5*a*, 5*b* and 5*c* illustrate a top, bottom and a cross-sectional side view, respectively, of a typical steam injection or exhaust plate.
Figure 5B:
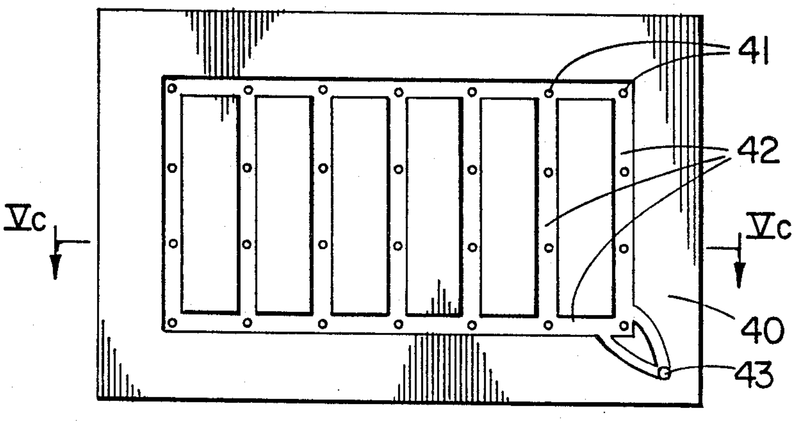
Figure 5C:
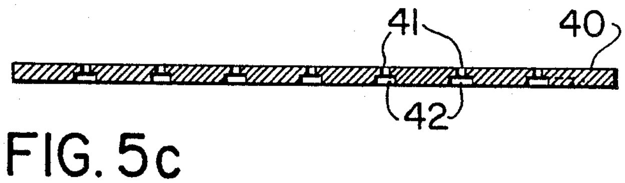

Referring now to FIGS. 5*a*, 5*b* and 5*c*, the steam plate 40 as illustrated is designed to function as a closed system steam supply plate or steam exhaust plate and can be interchangeably employed as the upper steam plate 11 which communicates with steam passage 4 as illustrated in FIG. 4, or lower plate 20 as seen in FIGS. 2 and 3, and which are in communication with lower steam passage 15. The upper surface of plate 40 is provided with a plurality of apertures 41 which on the underside of the plate communicate with interconnecting conduits 42 and which themselves communicate with connector conduit 43. This connecter conduit, with reference to FIGS. 2 and 3, enables steam passages 4 or 15 to directly communicate with apertures 41.

Figure 6A:
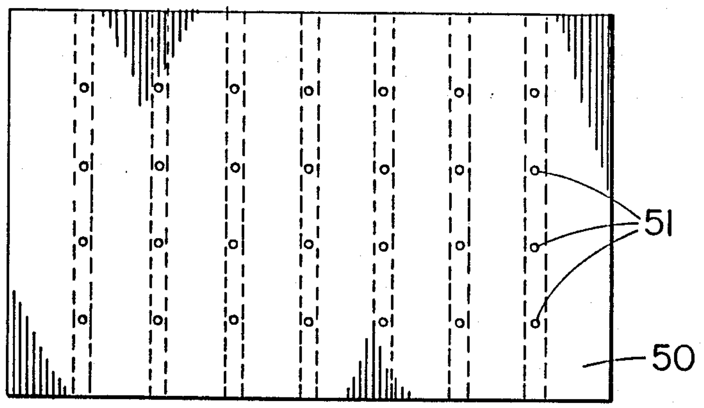
FIGS. 6*a*, 6*b* and 6*c* are respectively top, bottom and cross-sectional side views of a typical steam exhaust plate, again showing apertures and conduits, but where the conduits terminate at the plate edges.
Figure 6B:
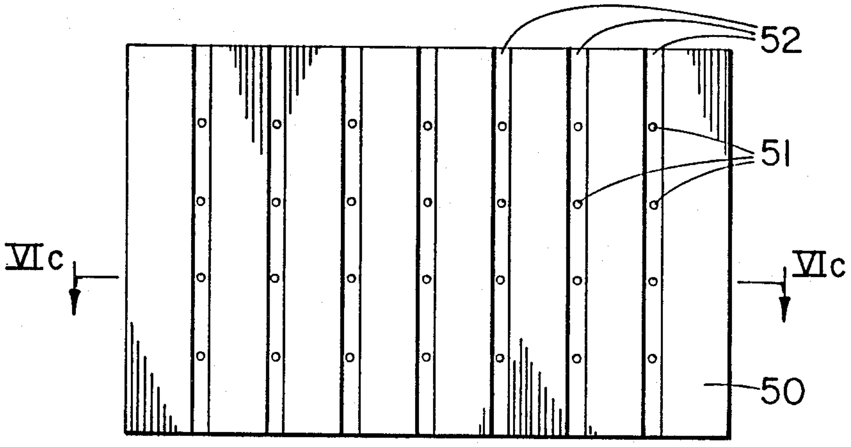
Figure 6C:
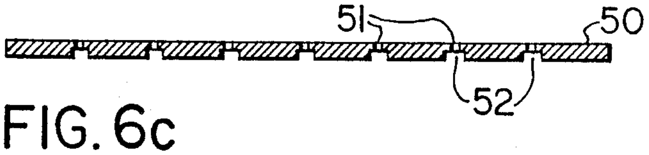

With particular reference to upper steam plate 11 seen in FIG. 3 and as also illustrated as 50 in FIGS. 6*a*, 6*b* and 6*c*, the face thereof is provided with a plurality of apertures 51 which, on their underside, communicate with a plurality parallel conduits as best seen in FIG. 6*b*. As will be discussed in greater detail below, this particular plate configuration is intended to permit steam passing through the mat to be exhausted or evacuated to the atmosphere via apertures 51 and conduits 52. When used as a steam exhaust plate, it will be appreciated that this plate 50 need not be located on the upper platen but can also be positioned on the lower platen. Furthermore, and although not seen in FIGS. 6*a* or 6*c*, in situations where plate 50 is used for steam exhaustion purposes as an upper plate (plate 11 in FIG. 3), it advantageously carries with it the border projection means 10.

With reference to the FIG. 4 embodiment, the steam exhaust plate as discussed above has been substituted with a wire mesh caul 60, the porosity of which is sufficient to enable steam which has passed through mat 8 to be exhausted to atmosphere. The wire mesh caul also facilitates transport of the mat both before and after pressing.

As indicated previously, the narrow perimeter framework is preferably either carried directly by the upper platen or indirectly by the upper steam plate if one is employed. As the press is closed, the projection means 10 which is co-related in size to the outer margins of the mat 8 engages the peripheral or marginal portion of the mat in the area generally designated as 7, so that while the major area of mat 8 subject to compression remains at its target thickness, that portion of the mat in area 7 underlying the framework 10 is further compressed and densified and which, as a result, effectively self-seals the mat from the atmosphere and renders it resistant to steam pressure built up in the mat during curing.

With reference to the FIGS. 1 and 2 press embodiments, it will be apparent that pressurized steam can be introduced into the pressed mat 8 through the top platen where steam passage 4 is connected to a source of steam supply (not shown) and that the steam passing therethrough can be slowly exhausted from the other side via lower steam passage 15. It will also be apparent that the steam flow direction can be reversed in the sense that it is caused to pass through mat 8 in a direction from the lower platen towards the upper platen and which is the steam flow direction that I prefer.

It is also possible, if desired, to change the flow direction back and forth during curing, or to initially inject steam from both sides of the mat and thereafter inject steam from one side and evacuate it at the other.

As seen in the FIG. 3 embodiment, and recognizing upper steam plate 11 therein illustrated communicates with the atmosphere as discussed in connection with FIG. 6, the supply of pressurized steam must be introduced into the mat via steam passage 15. The converse is true with respect to the FIG. 4 arrangement where steam is supplied through passageways 4 and exhausted to the atmosphere through wire mesh caul 60.

In operation, and after the mat has been formed on a lower steam plate which can function either as a steam injection or exhaustion plate as above discussed, or has been formed on a wire caul which is capable of functioning as an exhaust screen, the mat itself or the two items are loaded into the press by being positioned on the lower platen 2 with the press thereafter being closed resulting in the mat edges becoming sealed. Pressurized steam is then introduced into the pressed mat employing any one of the steam pressing procedures discussed previously.

During the steaming operation, steam can be slowly exhausted to atmosphere and once the steaming has been completed, the steam supply (not shown) is turned off and the pressure buildup within the mat permitted to diminish through exhaustion prior to opening the press.

In order to expedite steam evacuation, if desired, following steam supply shutdown and where a closed system steam passage arrangement exists for steam exhaustion, this passageway can advantageously be connected to a vacuum source (not shown). If desired, alternating and separate passageway means can be employed and connected to a vacuum source (not shown).

In order to condense residual steam that remains in the mat and thereby lower the vapour pressure which results in increased moisture content in the pressed product, which is some application can be regarded as advantageous, and in order to prevent or minimize steam blows following the steaming operation, cool air can also be passed through the pressed product utilizing the same system for supplying and evacuating the steam, and the flow direction of the air can either be in the same or reverse flow direction to that of the steam passing through the mat. Provision can also be made for separate cool air injection, if desired (not shown).

In practicing my invention, and as a result of the self-sealing feature, I have found that the steam pressure can be built up quicky and to a temperature higher than the boiling temperature of water, resulting in a fast dispersion of moisture and cure of the binder. This also permits furnish having high moisture content (e.g. 10% or higher) to be pressed in a very short press time when compared to known pressing techniques.

Following curing and after removal of the formed product from the press, that portion of the product which has undergone impingement can be trimmed off and the trimmings, if uncured, recycled as mat additive material.

It will be apparent to one skilled in the art that alterations can be made to the types of press constructions that I have disclosed, and to the steam injection techniques that I have described. Such changes should not be regarded as distracting from the spirit or scope of my invention as herein disclosed.

What is claimed is:

1. In a steam press of the type used in forming a cured product from a mat of compressible material and a uncured thermosetting binder and where the press includes upper and lower press platens which are movable between an open position to received said mat and a closed position of predetermined spacing to compress said mat and where steaming means is employed to pass steam through said compressed mat to cause said binder to cure, the improvement comprising border projection means which projects downwardly from the press face of said upper platen at a distance less than said predetermined distance and which is co-related in size to said mat so as to impinge upon and steam pressure seal the peripheral edges of said mat below said border projection means.

2. The steam press as claim 1 wherein said upper platen includes steam injection means and said lower platen includes steam exhaust means, and where said steam injection and exhaust means are located internally relative to said border projection means.

3. The steam press as claimed in claim 1 wherein said upper platen includes steam exhaust means and said lower platen includes steam injection means, and where said steam injection and exhaust means are located internally relative to said border projection means.

4. The steam press as claimed in claim 2 wherein said upper platen includes a steam injection press face plate.

5. The steam press as claimed in claim 4 wherein said lower platen includes a steam exhaust press face plate.

6. The steam press as claimed in claim 3 wherein said lower platen includes a steam injection press face plate.

7. The steam press as claimed in claim 6 wherein said upper platen includes a steam exhaust press face plate.

8. The steam press as claimed in claims 5 or 7 wherein said steam exhaust press face plate comprise a wire mesh caul plate.

9. The steam press as claimed in claim 2 wherein one of said upper and lower platens includes cold air injection means and the other of said platens includes cold air exhaust means for passing cold air through said compressed mat.

10. The steam press as claimed in claim 9 wherein said cold air injection means includes one of said steam injection means and said steam exhaust means, and said cold air exhaust means includes the other of said steam injection means and said steam exhaust means.

11. The steam press as claimed in claim 3 wherein one of said upper and lower platens includes cool air injection means and the other of said platen includes cool air exhaust means for passing cool air through said compressed mat.

12. The steam press as claimed in claim 3 wherein said cool air injection means includes one of said steam injection means and said steam exhaust means, and said cool air exhaust means includes the other of said steam injection means and said steam exhaust means.

13. The steam press as claimed in claims 2 or 3 wherein one of said upper and lower platens further includes vacuum exhaust means for withdrawing residual steam pressure from said cured mat.

14. The steam press as claimed in claims 1 or 2 wherein said mat and said border projection are rectangular.

15. In a steam press of the type used in forming composite board from a mat of lignocellulosic material and a uncured thermosetting binder, and which includes opposed press platens moveable between an open position to receive said mat, and a closed position of predetermined spacing to compress said mat, and which also includes steaming means for curing said uncured binder when said mat is compressed, the improvement comprising projection means extending outwardly from one face of said opposed press platens a distance less than said predetermined distance and which is dimensioned so as to impinge upon the further densify said mat about its peripheral edges and to thereby create a pressure resistant seal in the mat at its said peripheral edges.

16. The steam press as claimed in claim 15 wherein said opposed press platens are upper and lower press platens, said projection means extends outwardly from the face of said upper press planten, said steaming means includes steam injection means and steam exhaust means associated with at least one of said platens, and wherein said steam injection and steam exhaust means relative to said mat are located interior of said peripheral edges of said mat.

* * * * *